(12) United States Patent
Kayumi et al.

(10) Patent No.: US 6,827,388 B2
(45) Date of Patent: Dec. 7, 2004

(54) SEAT ARRANGEMENT STRUCTURE FOR VEHICLE

(75) Inventors: Tetsuya Kayumi, Kawachi-gun (JP); Osamu Shirose, Utsunomiya (JP); Shinsuke Watanabe, Utsunomiya (JP); Yoshinori Nakamura, Utsunomiya (JP); Ohsuke Koike, Toda (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/663,961

(22) Filed: Sep. 16, 2003

(65) Prior Publication Data

US 2004/0056521 A1 Mar. 25, 2004

(30) Foreign Application Priority Data

Sep. 19, 2002 (JP) .................................... 2002/273351

(51) Int. Cl.[7] ................................................ B60N 2/00
(52) U.S. Cl. ...................................... 296/64; 296/65.13
(58) Field of Search ...................... 296/63, 64, 65.13; 297/232, 257

(56) References Cited

U.S. PATENT DOCUMENTS

| | | | |
|---|---|---|---|
| 1,397,594 A | * | 11/1921 | Quincy .................. 296/110 |
| 1,965,048 A | | 7/1934 | Morris |
| 5,611,589 A | * | 3/1997 | Fujii et al. .................. 296/64 |
| 5,947,541 A | * | 9/1999 | Behrens et al. ............... 296/64 |
| 5,951,084 A | * | 9/1999 | Okazaki et al. ............ 296/37.16 |
| 2001/0030440 A1 | | 10/2001 | Ney |

FOREIGN PATENT DOCUMENTS

| | | |
|---|---|---|
| FR | 1 053 218 | 2/1954 |
| FR | 2 775 637 | 9/1999 |
| FR | 2 828 150 | 2/2003 |
| GB | 24 559 | 4/1914 |
| JP | 56-83537 | 7/1981 |

* cited by examiner

Primary Examiner—Joseph D. Pape
(74) Attorney, Agent, or Firm—Merchant & Gould P.C.

(57) ABSTRACT

A seat arrangement structure for a vehicle including a pair of right and left first side seats; a first center seat disposed between the pair of first side seats; a pair of right and left second side seats; and a second center seat disposed between the pair of second side seats. The first center seat is made slidable only within a range at a back of a position where a front end portion of the first center seat is aligned with that of the pair of first side seats. Each of the pair of first side seats is made slidable only within a range in front of the position where the front end portion of the pair of first side seats is aligned with that of the first center seat. The width of the first center seat is made narrower than that of the pair of first side seats.

4 Claims, 9 Drawing Sheets

SEAT ARRANGEMENT STRUCTURE FOR VEHICLE

BACKGROUND OF THE INVENTION

1. Field of the Invention

The present invention relates to a seat arrangement structure for a vehicle.

2. Description of Related Art

As an example of a technique relating to a seat arrangement structure for a vehicle, one which is described in Japanese Utility Model Application No. Sho 56-83537 ('537 publication) is known.

In the above '537 publication, a structure is disclosed in which seats in a first row, viewed from the front of the vehicle, includes a pair of side seats placed at right and left sides of the vehicle and a center seat having the same width as the pair of side seats which is disposed between the pair of side seats, and seats in a second row includes a pair of side seats placed at the right side and the left side of the vehicle and a center seat having the same width as that of each of the pair of side seats which is disposed between the pair of side seats. In this structure, the position of each of the pair of side seats is fixed, and the center seat is made slidable in a backward direction from a position where it is aligned with the pair of side seats. Accordingly, the seats may be arranged in a V-shaped layout by placing the center seat at a backward position with respect to the position of the pair of side seats so that shoulders or elbows of one passenger do not touch those of another passenger, and passengers do not feel cramped.

However, in the technique disclosed in the above '537 publication, since the position of each of the side seats in the first row is fixed, it may become difficult for a person to drive the vehicle, depending on, for example, the build of the person driving the vehicle.

With regard to a car of small-size, on the other hand, it has been desired to make it possible to carry six occupants from the viewpoint of improving convenience, and hence it is effective if the above-explained V-shaped layout is adopted for a small car to prevent the crowding among passengers. However, if the V-shaped layout is simply adopted for a small car, the width of a side seat (i.e., main seat) becomes narrower and makes the seating feeling thereof uncomfortable. Since it does not happen very often that six people ride together, even if a vehicle can carry six people, it is not preferable to sacrifice the comfort of the main seats for such rare events. Also, if it becomes possible to realize the V-shaped layout for a three-person seat without sacrificing the comfort, it will be useless if a passenger does not know that the center seat can be slid to an appropriate position to form the V-shaped layout in order to relieve discomfort.

SUMMARY OF THE INVENTION

Accordingly, an object of the invention is to provide a seat arrangement structure for a vehicle which does not make driving of the vehicle difficult for a driver, does not sacrifice the comfort of a seat, and makes a V-shaped layout possible by properly sliding a seat.

In order to achieve the above object, a first aspect of the present invention provides a seat arrangement structure for a vehicle, including: a pair of first side seats (for instance, first side seats 11 explained in the following embodiment) disposed at right and left side of the vehicle; a first center seat (for instance, a first center seat 16 explained in the following embodiment) disposed between the pair of first side seats, the first center seat and the pair of first side seats being disposed in a first row viewed from a front of the vehicle; a pair of second side seats (for instance, second side seats 21 explained in the following embodiment) disposed at the right side and the left side of the vehicle; and a second center seat (for instance, a second center seat 26 explained in the following embodiment) disposed between the pair of second side seats; the second center seat and the pair of second side seats being disposed in a second row viewed from the front of the vehicle; wherein the first center seat is made slidable, in a back and forth direction, only within a range at a back of a position where a front end portion of the first center seat is aligned with a front end portion of each of the pair of first side seats; each of the pair of first side seats is made slidable, in a back and forth direction, only within a range in front of the position where the front end portion of the pair of first side seats is aligned with the front end portion of the first center seat; and a width of the first center seat is made narrower than a width of each of the pair of first side seats.

According to the above seat arrangement structure for a vehicle of the first aspect of the invention, since the pair of first side seats is made slidable in the back and forth direction, it becomes possible to adjust the position of the first side seats in accordance with, for example, the build of the driver.

Also, since the first center seat is made slidable, in a back and forth direction, only within a range at a back of a position where a front end portion of the first center seat is aligned with a front end portion of each of the pair of first side seats; and each of the pair of first side seats is made slidable, in a back and forth direction, only within a range in front of the position where the front end portion of the pair of first side seats is aligned with the front end portion of the first center seat, a V-shaped layout of the three seats is reliably formed even if three passengers sitting on the front seats do not know that such a layout can be formed, when the seats are arbitrary slid by a passenger due to cramped feeling, etc.

Moreover, since the front end portion of the first center seat may be aligned with the front end portion of each of the pair of first side seats at the first row, it becomes possible to form a straight line layout in which the position of the first center seat is not shifted from the position of the first side seats.

Furthermore, since the width of the first center seat is made narrower than the width of each of the pair of first side seats, it becomes possible to maintain the width of the first side seats which may be used more occasionally when a small number of passengers ride in the vehicle.

As explained above, since the width of the first center seat is made narrower while the width of the first side seats is made relatively wider, it becomes possible to effectively utilize a limited space in a vehicle and realize a small car carrying six passenger. Also, it becomes possible to realize a V-shaped layout of the seats in a vehicle to prevent uncomfortable contact of adjacent passengers.

A second aspect of the present invention provides a seat arrangement structure for a vehicle as set forth in the above first aspect, wherein the second center seat is made slidable, in a back and forth direction, only within a range at a back of a position where a front end portion of the second center seat is aligned with a front end portion of each of the pair of second side seats; a position of each of the pair of second side seats is fixed; and a width of the second center seat is made narrower than a width of each of the pair of second side seats.

According to the above seat arrangement structure for a vehicle of the second aspect of the invention, since the second center seat is made slidable, in a back and forth direction, only within a range at a back of a position where a front end portion of the second center seat is aligned with a front end portion of each of the pair of second side seats; and the position of each of the pair of second side seats is fixed, a V-shaped layout of the three seats is reliably formed even if a passenger sitting on the second center seat does not know such a layout can be formed, when the seat is arbitrary slid by the passenger due to cramped feeling, etc.

Moreover, since the front end portion of the second center seat may be aligned with the front end portion of each of the pair of second side seats in the second row, it becomes possible to form a straight line layout in which the position of the second center seat is not shifted from the position of the second side seats.

Furthermore, since the width of the second center seat is made narrower than the width of each of the pair of second side seats, it becomes possible to maintain the width of the second side seats which may be more occasionally used when a small number of passengers ride in the vehicle.

As explained above, since the width of the second center seat is made narrower while the width of the second side seats is made relatively wider, it becomes possible to effectively utilize the limited space in a vehicle and realize a small car which can carry six passengers. Also, it becomes possible to realize a V-shaped layout of the seats in a vehicle to prevent uncomfortable contact of adjacent passengers.

A third aspect of the present invention provides a seat arrangement structure for a vehicle as set forth in the first or second aspect of the invention, further including: a trunk room (for instance, a trunk room 30 explained in the following embodiment) which is disposed directly behind the pair of second side seats and the second center seat, wherein the second center seat, with its seat back being brought forward, is moved down to be placed on a low-level floor (for instance, a low-level floor 31 explained in the following embodiment) in front so that a substantially flat floor with a T-shape (for instance, a floor 66 explained in the following embodiment) including the seat back of the second center seat and a floor of the trunk room, and a T-shaped space (for instance, a space 67 explained in the following embodiment) on the substantially flat floor of the T-shape, are formed.

According to the above seat arrangement structure for a vehicle of the third aspect of the invention, since the substantially flat T-shaped floor which includes the seat back of the second center seat and the trunk room floor is formed and the T-shaped space is formed on the T-shaped floor by moving down the second center seat, with its seat back being brought forward, so as to be located above the low-level floor, an object which is long can be suitably accommodated in the vehicle. Accordingly, the convenience of the vehicle is improved.

A fourth aspect of the present invention provides a seat arrangement structure for a vehicle as set forth in the third aspect of the invention, wherein an area of the substantially flat T-shaped floor, and an area of the T-shaped space, are increased by bringing down a seat back of the first center seat in a forward direction.

According to the above seat arrangement structure for a vehicle of the fourth aspect of the invention, since the area of the substantially flat T-shaped floor, and an area of the T-shaped space, are increased by bringing down a seat back of the first center seat in a forward direction, an object which is long can be suitably accommodated in the vehicle. Accordingly, the convenience of the vehicle is improved.

BRIEF DESCRIPTION OF THE DRAWINGS

Some of the features and advantages of the invention have been described, and others will become apparent from the detailed description which follows and from the accompanying drawings, in which.

DETAILED DESCRIPTION OF THE INVENTION

The invention summarized above and defined by the enumerated claims may be better understood by referring to the following detailed description, which should be read with reference to the accompanying drawings. This detailed description of particular preferred embodiments, set out below to enable one to build and use particular implementations of the invention, is not intended to limit the enumerated claims, but to serve as particular examples thereof.

Hereinafter, the seat arrangement structure of a vehicle according to embodiments of the present invention will be described with reference to the accompanying drawings. Note that the words "front", "back (rear)", "right", and "left" used in the following explanation mean "front", "back (rear)", "right", and "left" with respect to the body of a vehicle.

Figure 1:
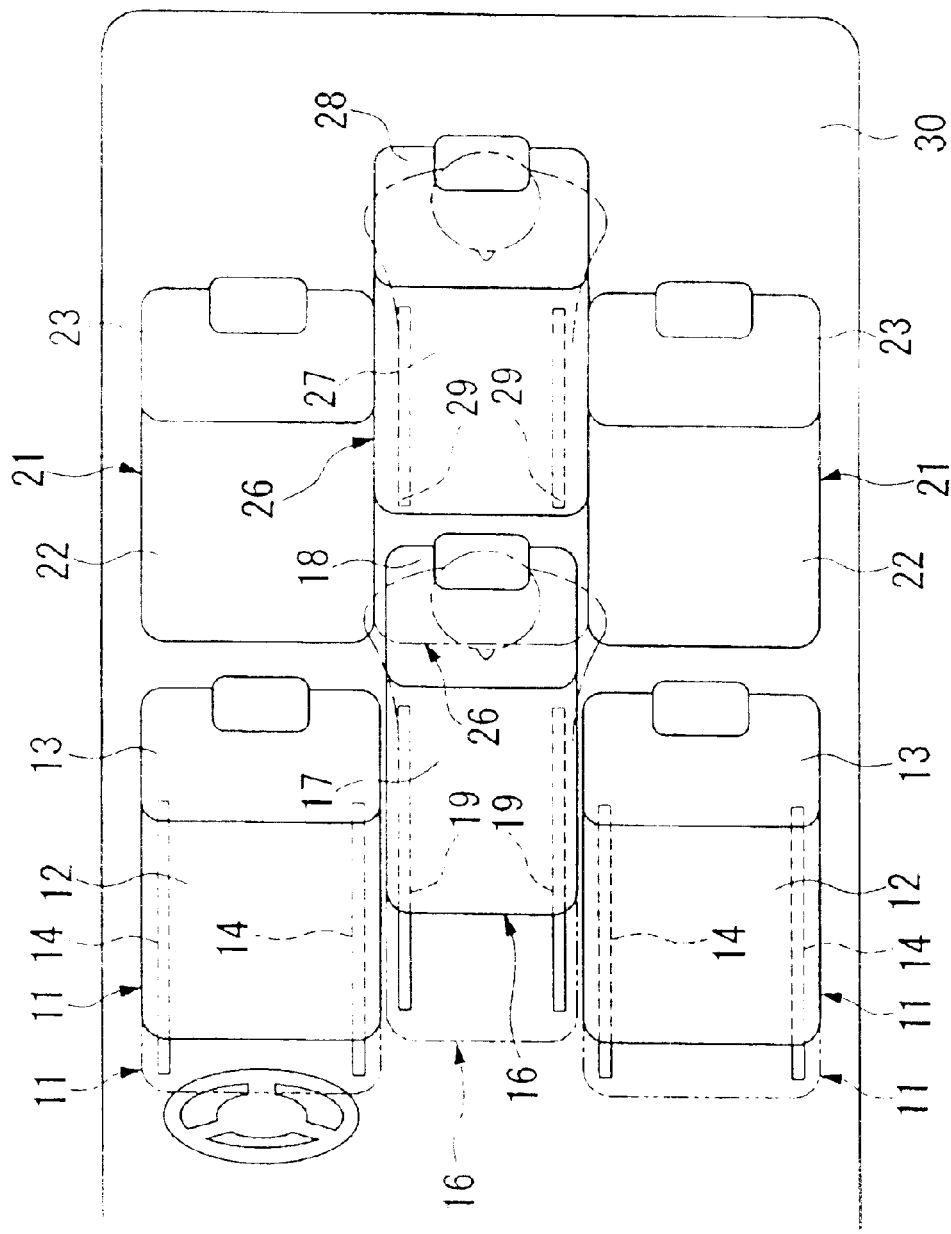
FIG. 1 is a diagram showing a plan view of a seat arrangement structure for a vehicle according to an embodiment of the present invention.

As shown in FIG. 1, the seat arrangement structure for a vehicle according to this embodiment of the present invention is applied to two three-person seat arrangement structures in a car for six passengers having first and second row seats, the first row seat including a pair of first side seats 11 which are disposed at the right and left sides of the vehicle and a first center seat 16 which is disposed between the first side seats 11, and the second row seats including a pair of second side seats 21 which are disposed at the right and left sides of the vehicle and a second center seat 26 which is disposed between the second side seats 21, and a trunk room 30 located directly behind the second row seats.

Each of the pair of right and left first side seats 11 in the front row includes a seat cushion 12 and a seat back 13 attached to the rear end of the seat cushion 12. Also, each of the side seats 11 is disposed so as to be slidable in the back and forth direction, independently of each other, by means of a slide mechanism 14 which is placed below the seat cushion 12. Note that the slidable range of the first side seats 11 by the slide mechanism 14 is the same with respect to each other.

The first center seat 16 which is disposed between the first side seats 11 at the front row has a width in the right and left direction narrower than that of each of the first side seats 11. The first center seat 16 includes a seat cushion 17 and a seat back 18 attached to the rear end of the seat cushion 17. Also, the first center seat 16 is disposed so as to be slidable in the back and forth direction by means of a slide mechanism 19 which is placed below the seat cushion 17. Note that the seat back 18 of the first center seat 16 is formed to be capable of being brought down in a front direction so as to be entirely placed on the seat cushion 17. Also, the size of the first center seat 16 is substantially the same as the size of each of the first side seats 11 except the width thereof in the right and left direction.

In this embodiment, a part of the slidable range in the back and forth direction of the first center seat 16 by means of the slide mechanism 19 is shifted in a backward direction with respect to that of each of the first side seats 11 by the slide mechanism 14. That is, the first center seat 16 is made slidable only in a backward direction from a position where the front end portion thereof is aligned with the front end portion of the pair of first side seats 11, and the pair of first side seats 11 are made slidable only in a front direction from a position where the front end portion thereof is aligned with the front end portion of the first center seat 16. Moreover, the slidable range of the first center seat 16 by the slide mechanism 19 is set to be larger than that of the first side seats 11 by means of the slide mechanism 14.

More specifically, as indicated by double-dotted chain lines shown in FIG. 1, when each of the pair of side seats 11 is located at the respective front end position by means of the slide mechanism 14 and the first center seat 16 is located at the front end position by means of the slide mechanism 19, the first center seat 16 is located backward with respect to the pair of the first side seats 11 in a predetermined distance so as to form a V-shaped layout.

Figure 2:
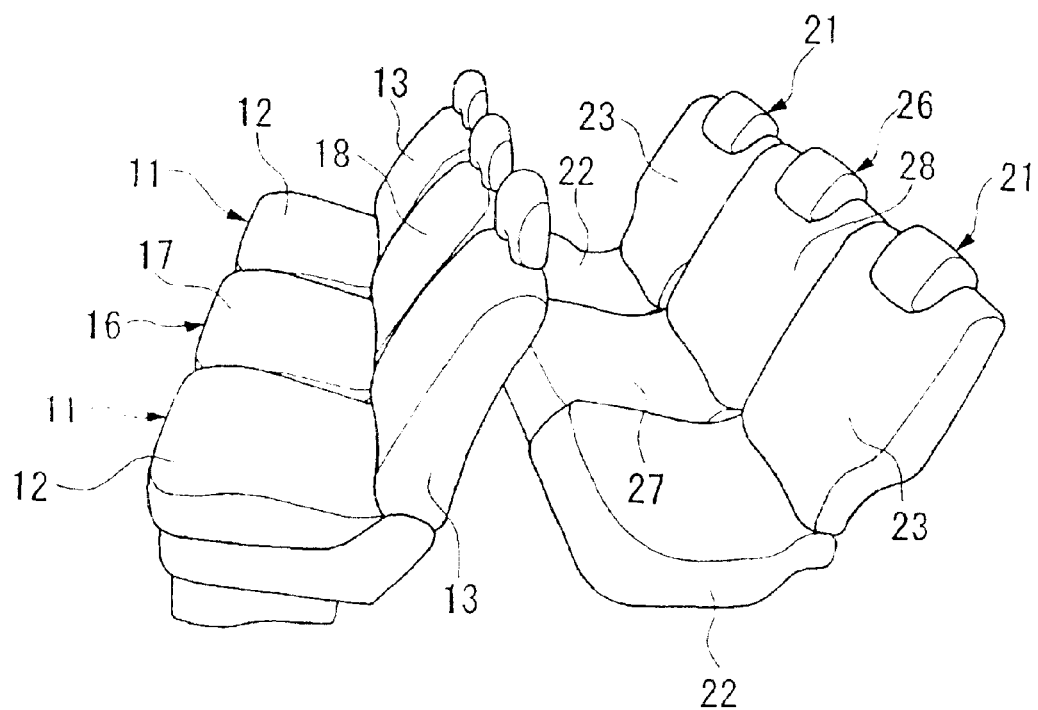
FIG. 2 is a diagram showing a perspective view of a state of the seat arrangement structure for a vehicle according to an embodiment of the present invention.

Also, when each of the first side seats 11 is located at the respective rear end position by means of the slide mechanism 14 as indicated by the solid lines shown in FIG. 1, and the center seat is located at the front end position by means of the slide mechanism 19 by means of the slide mechanism 19 as indicated by double-dotted chain lines shown in FIG. 1, a straight line layout is formed in which the front and rear ends of the first side seats 11 and the first center seat 16 are aligned as is also shown in FIG. 2.

Moreover, when each of the first side seats 11 is located at the front end position by means of the slide mechanism 14 as indicated by the double-dotted chain lines shown in FIG. 1 and the first center seat 16 is located at the rear end position by means of the slide mechanism 19 as indicated by the solid line shown in FIG. 1, the first center seat 16 is located backward with respect to the pair of the first side seats 11 in a predetermined distance so as to form a V-shaped layout. In this layout, the sliding degree of the first center seat 16 by means of the slide mechanism 19 is predetermined so that the shoulders of a passenger sitting on the first center seat 16 are completely separated from the shoulders of a passenger sitting on each of the first side seats 11 when the reclining angle of the seat back 18 of the first center seat 16 is the same as that of the seat back 13 of each of the first side seats 11.

Figure 3:
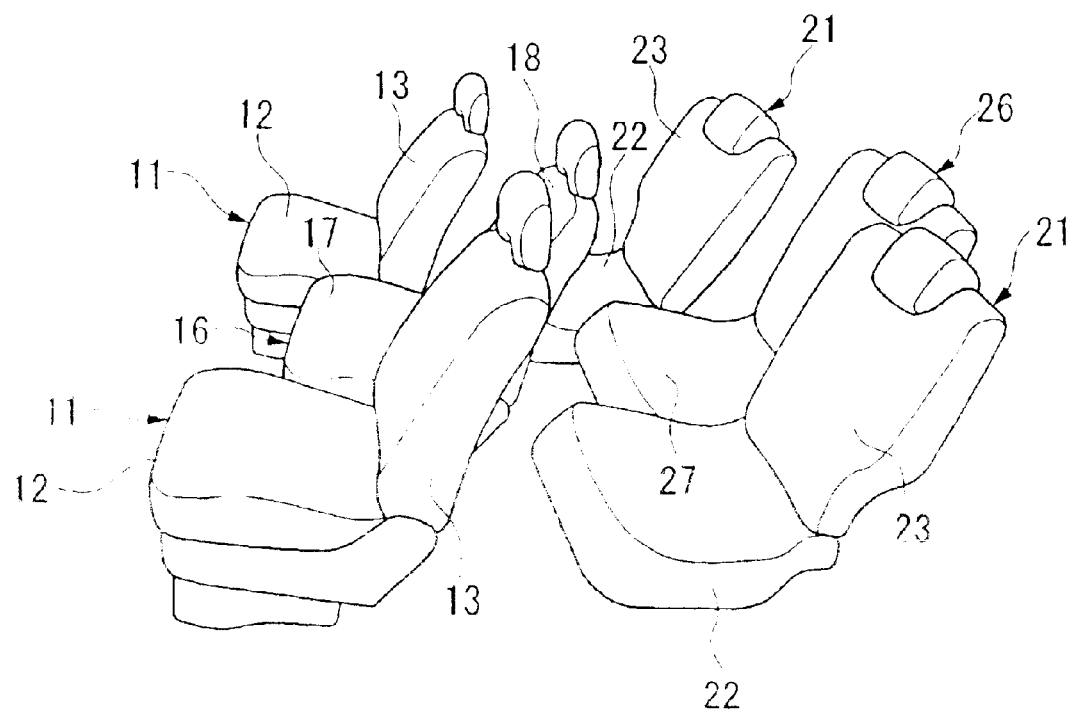
FIG. 3 is a diagram showing a perspective view of another state of the seat arrangement structure for a vehicle according to an embodiment of the present invention.

Furthermore, when each of the first side seats 11 is located at the rear end position by means of the slide mechanism 14 as indicated by the solid lines shown in FIG. 1 and the first center seat 16 is located at the rear end position by means of the slide mechanism 19, the first center seat 16 is located backward with respect to the pair of the first side seats 11 at a predetermined distance so as to form a V-shaped layout as also shown in FIG. 3. In this layout also, the sliding degree of the first center seat 16 by means of the slide mechanism 19 is predetermined so that the shoulders of a passenger sitting on the first center seat 16 are completely separated from the shoulders of passengers sitting on each of the first side seats 11 when the reclining angle of the seat back 18 of the first center seat 16 is the same as that of the seat back 13 of each of the first side seats 11.

That is, whenever the first center seat 16 is located at the rear end position, the shoulders of a passenger sitting on the first center seat 16 are always completely separated from the shoulders of a passenger sitting on each of the first side seats 11 regardless of the position of the first side seats 11.

On the other hand, each of the pair of right and left second side seats 21 at the second row includes a seat cushion 22 and a seat back 23 attached to the rear end of the seat cushion 22. The second side seats 21 are fixed and hence made so as not to be slidable in the front and back direction. Note that the size of each of the second side seats 21 is the same including the width in the right and left direction. Also, the width of each of the second side seats 21 at the second row in the right and left direction is made slightly narrower than that of each of the first side seats 11 at the first row.

Also, the width of the second center seat 26 which is disposed between the second side seats 21 in the right and left direction, is made narrower than that of each of the second side seats 21, and is slightly wider than the width of the first center seat 16 at the first row in the right and left direction. In addition, the center position in the right and left direction of the second center seat 26 is aligned with the center position in the right and left direction of the first center seat 16. The second center seat 26 includes a seat cushion 27 and a seat back 28 attached to the rear end of the seat cushion 27, and is disposed so as to be slidable in the back and forth direction, independently, by means of a slide mechanism 29 which is placed below the seat cushion 27. Note that the size of the second center seat 26 is substantially the same as the size of each of the second side seats 21 except the width thereof in the first and right direction.

In this embodiment, the slidable range of the second center seat 26 in the back and forth direction by means of the slide mechanism 29 extends backwardly beyond the rear end position of each of the second side seats 21 whose position is fixed, and the second center seat 26 is made slidable only in a backward direction from a position where the front end portion thereof is aligned with the front end portion of the second side seats 21.

More specifically, when the second center seat 26 is located at the front end position by means of the slide mechanism 29 as indicated by the double-dotted chain lines shown in FIG. 1, a straight line layout is formed in which the front and rear ends of the second side seats 21 and the second center seat 26 are aligned as also shown in FIG. 2.

Also, when the second center seat 26 is located at the rear end position by means of the slide mechanism 29 as indicated by the solid lines shown in FIG. 1, the second center seat 26 is located backward with respect to the pair of the second side seats 21 in a predetermined distance so as to form a V-shaped layout as also shown in FIG. 3. In this layout, the sliding degree of the second center seat 26 by means of the slide mechanism 29 is predetermined so that the shoulders of a passenger sitting on the second center seat 26 are completely separated from the shoulders of passengers sitting on each of the second side seats 21 when the reclining angle of the seat back 28 of the second center seat 26 is the same as that of the seat back 23 of each of the second side seats 21.

Next, the second center seat 26 in the second row will be explained further in detail.

Figure 4:
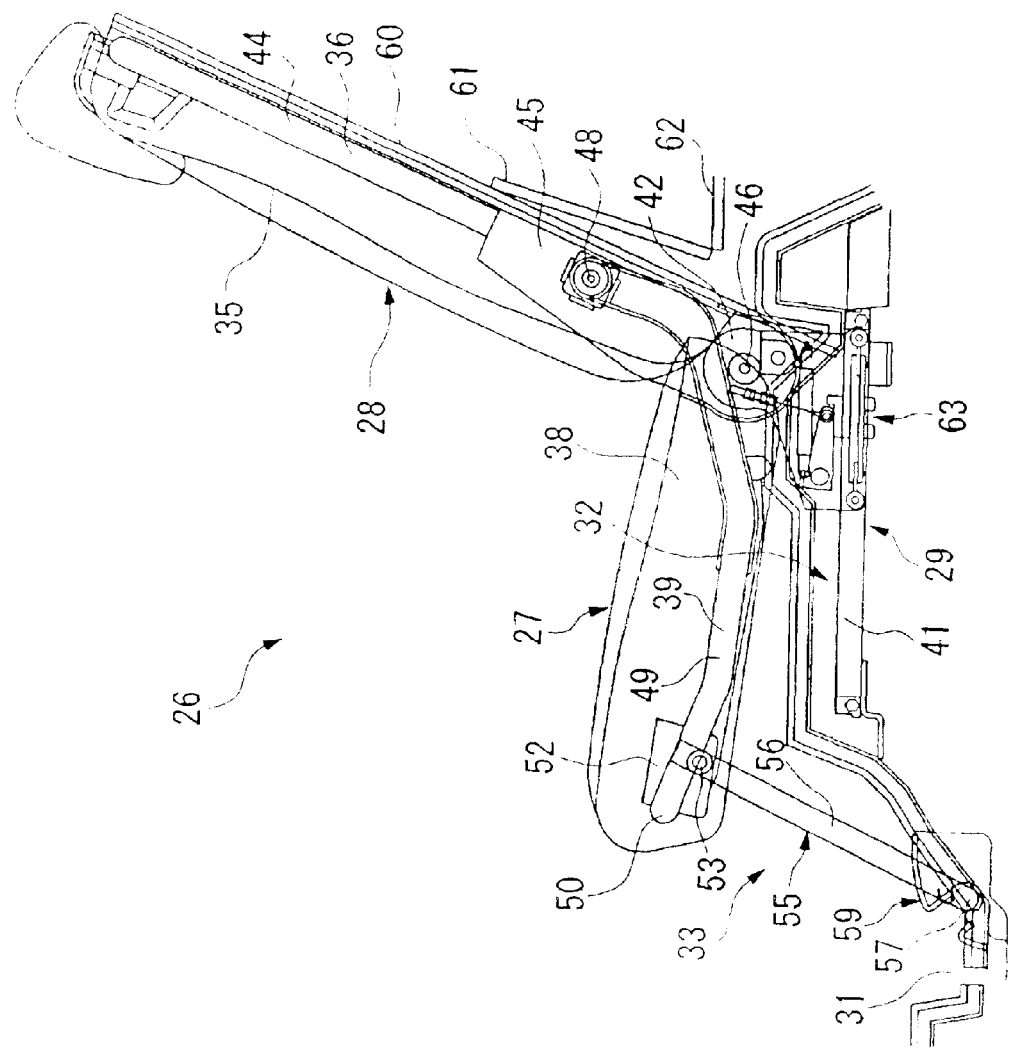
FIG. 4 is a diagram showing a side view of a second center seat located at a rear end position, which is used in the seat arrangement structure for a vehicle according to an embodiment of the present invention.

The second center seat 26 at the second row is disposed, as shown in FIG. 4, at a floor 33 having difference in level formed by a low-level floor 31 located at the front side of the interior of the vehicle and a high-level floor 32 located at the rear side of the interior of the vehicle adjacent to the low-level floor 31.

The seat back 28 of the second center seat 26 includes a seat back main body 35 which may function as a cushion to support the back of a passenger, and a seat back frame 36 which holds the seat back main body 35.

Also, the seat cushion 27 of the second center seat 26 includes a seat cushion main body 38 which may function as a cushion to support the hip of a passenger, and a seat cushion frame 39 which holds the seat cushion main body 38.

Figure 5:
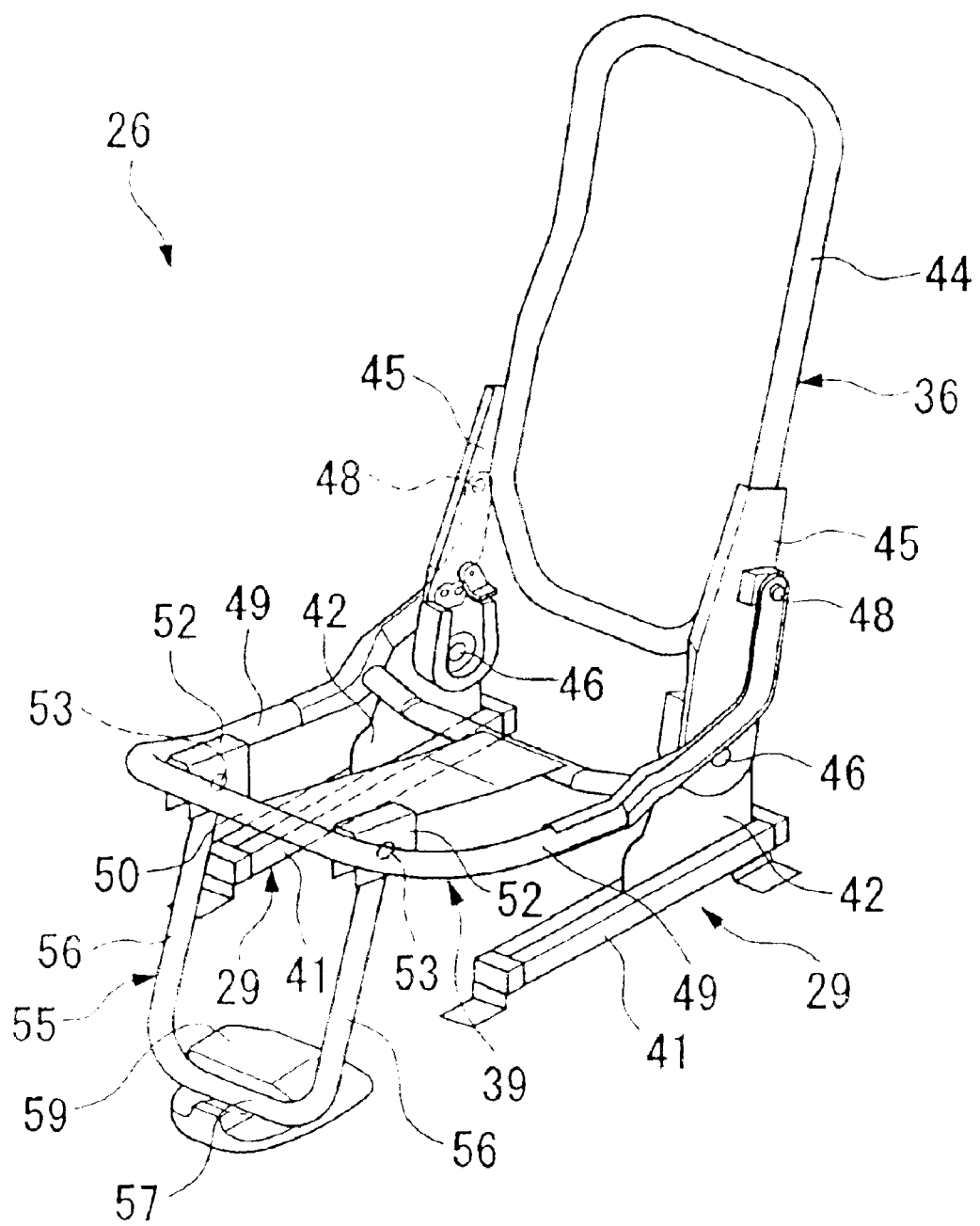
FIG. 5 is a diagram showing a perspective view of the second center seat used in the seat arrangement structure for a vehicle according to an embodiment of the present invention.

Moreover, a pair of slide rail members 41 extending along the front and back direction of the vehicle are provided with an interval between each other on the high-level floor 32 as is also shown in FIG. 5. Each of the pair of slide rail members 41 supports a slide member 42 so as to be slidable only in the back and front direction. These slide rail members 41 and the slide members 42 form the slide mechanism 29.

The seat back frame 36 includes a frame member 44 having an approximately rectangular shape, and a pair of supporting members 45 each of which is fixed to the right and left side, respectively, of the frame members 44 in the length direction of the frame member 44 so as to extend towards the outside of the frame member 44. Also, a rotary shaft portion 46 whose axis line extends in the right and left direction of the vehicle is provided with an extending end portion of each of the supporting members 45. The rotary shaft portion 46 is supported by the respective slide member 42. In this manner, the seat back frame 36 can be brought down in a forward direction by rotating around the rotary shaft portion 46 from its normal state extending in a substantially vertical direction. The seat back 28 including the seat back main body 35 which is supported by the frame member 44 of the seat back frame 36 as a whole can be brought down in a forward direction by rotating around the rotary shaft portion 46 from its normal state extending in a substantially vertical direction.

As a result, the seat back 28 is supported so as to be rotatable in a front direction by the slide members 42 which move being guided by the slide rail members 41.

A supporting shaft 48 whose central axis extends in the right and left direction of the vehicle is disposed at a position above the rotary shaft portion 46 provided with the supporting member 45 by a predetermined distance in a normal state of the seat back frame 36. Also, a rear portion of the seat cushion frame 39 is rotatably supported by the supporting shaft 48. That is, the seat cushion frame 39 as a whole has a U-shape, and includes a pair of extending portions 49 extending from the respective supporting shaft 48 in a downward direction and subsequently in a front direction, and a connection member 50 extending in the right and left direction of the vehicle which connects an extending end of each of the extending portions 49. The seat cushion main body 38 is supported at more or less the connection member 50 side of the seat cushion frame 39.

A pair of right and left supporting parts 52 are attached to the connection member 50 forming the front end of the seat cushion frame 39, and a rotary shaft 53 having a central axis extending in the right and left direction is provided with each of the supporting parts 52. An end portion of a link arm 55 is rotatably connected to the rotary shaft 53. That is, the link arm 55 has a U-shape formed by a pair of extending portions 56 extending from the rotary shaft 53, and a connection part 57 extending in the right and left directions so as to connect an extending end of each of the extending portions 56.

Also, a supporting member 59 is disposed on the low-level floor 31, which removably fixes the connection part 57 of the end of the link arm 55 and rotatably supports the connection part 57 in a fixed state.

As a result, the connection member 50 of the front portion of the seat cushion frame 39 is linked and connected to the low-level floor 31.

As mentioned above, the pair of second side seats 21 and the second center seat 26 are disposed directly in front of the trunk room 30 having substantially the same width as the total width of the pair of second side seats 21 and the second center seat 26. Note that a contact plate 61 which may contact a back surface 60 of the second center seat 26 is connected to a flat trunk room floor 62 of the trunk room 30 located behind the center seat 26 in an reciprocating manner.

The above-mentioned flat trunk room floor 62 is located behind the pair of second side seats 21 and the second center seat 26, and has substantially the same width in the right and left directions as the total width of the pair of second side seats 21 and the second center seat 26. Also, the trunk room floor 62 has a U-shape from which a portion of the contact plate 61 which contacts, in an inclined state, the back surface 60 of the seat back 28 of the second center seat 26 in a seatable state is removed.

Figure 9:
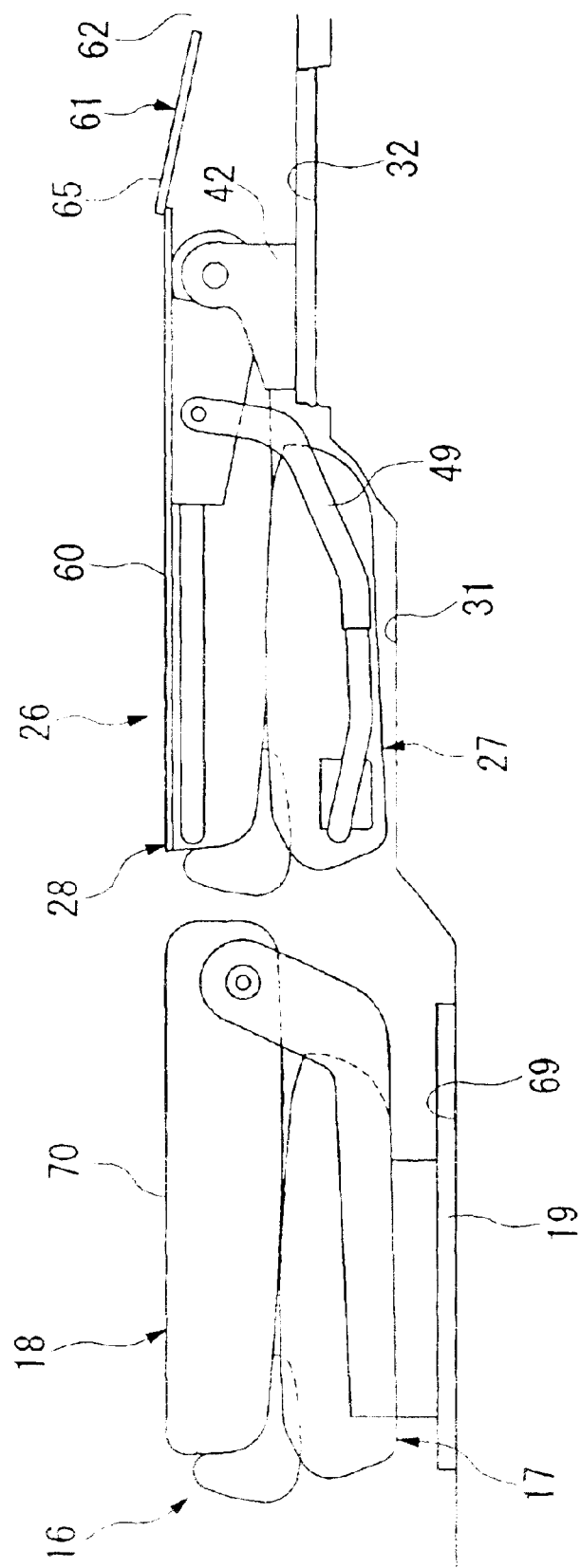
FIG. 9 is a diagram showing a side view of the seat arrangement structure for a vehicle with the second center seat in a dive-down state and a first center seat in a forward brought-down state according to an embodiment of the present invention.

Note that as shown in FIG. 9, the pair of the first side seats 11 and the first center seat 16 in the first row are disposed on a floor 69, the level of which is lower than the lower-floor 31 located behind.

Next, the operation of the above second center seat will be explained.

First, a seatable state in which passengers may be seated normally will be explained with reference to FIGS. 4 and 6.

In the seatable state, the seat back 28 is fixed to the slide members 42 in a normal state by a lock mechanism, which is not shown in the figure. Also, the connection part 57 of the link arm 55 is fixed by the supporting member 59. Note that the lock mechanism is capable of fixing and releasing the seat back 28 to/from the slide members 42 in a seatable state.

In this seatable state, the slide members 42 slide along the slide rails 42. In this embodiment, the slide members 42 may be fixed and released to/from the slide rails 42 at a plurality of positions by the slide lock mechanism 63.

Figure 6:
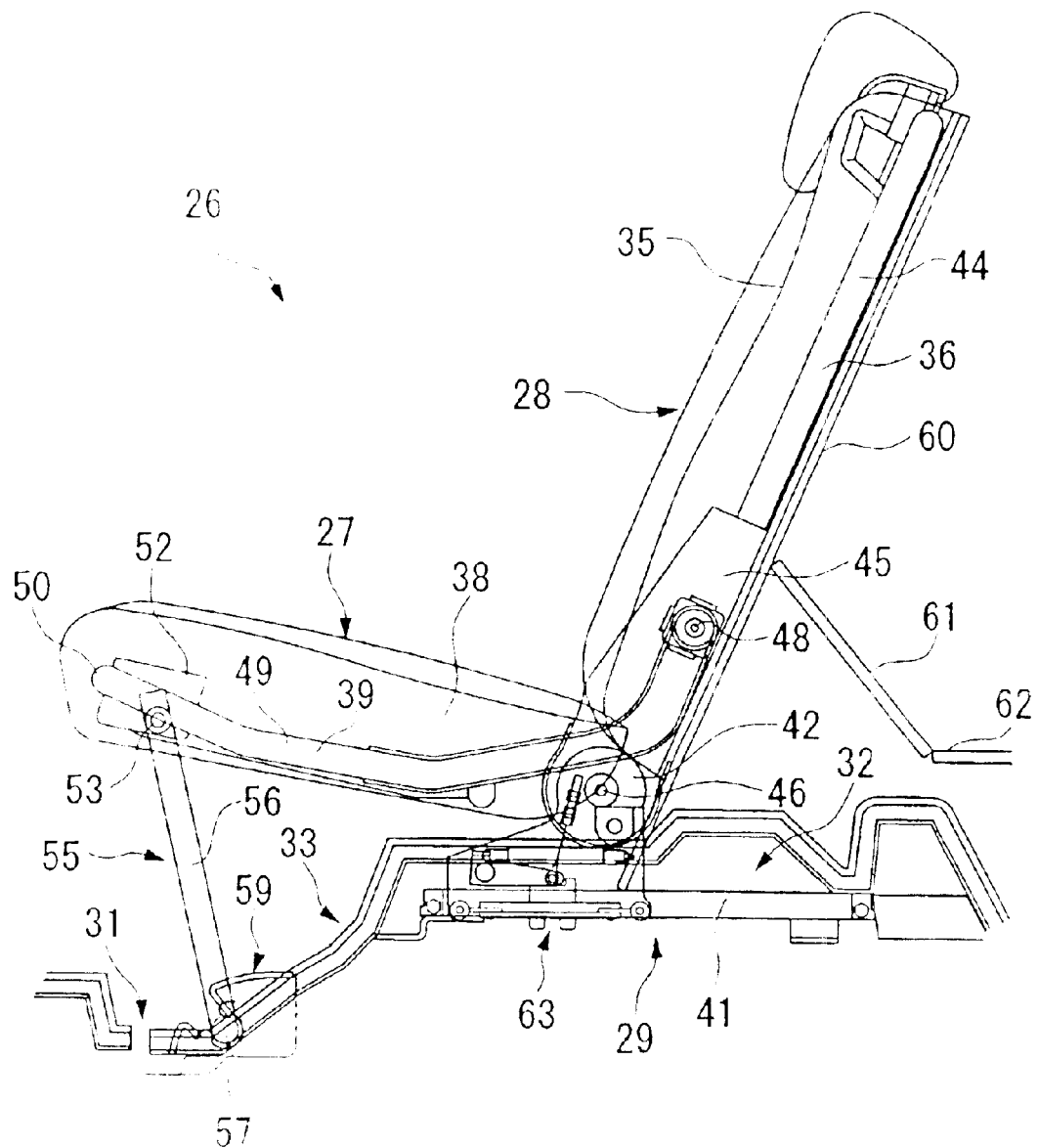
FIG. 6 is a diagram showing a side view of the second center seat located at a front end position, which is used in the seat arrangement structure for a vehicle according to an embodiment of the present invention.

When the slide members 42 slide from a rear end position of the slidable range as shown in FIG. 4 to a front end position of the slidable range as shown in FIG. 6 by being guided by the slide rails 41 fixed to the high-level floor 32, the seat back 28 fixed to the slide members 42 also slide while maintaining its positioning state. The seat cushion 27 which is rotatably connected to the supporting shaft 48, on the other hand, slides while moving the front side thereof so as to draw a slightly arc shape track by rotating the link arm 55 which is rotatably connected to the rotary shaft 53, around the connection part 57 supported by the supporting member 59. Also, when slid backwardly, an opposite operation of the above operation is carried out.

As explained above, since the seat back 28 is axially supported by the slide members 42 which are guided by the slide rails 41 on the high-level floor 32, and the rear portion of the seat cushion frame 39 which supports the seat cushion main body 38 is axially supported by the seat back 28 and the front portion thereof is linked to the low-level floor 31 when slid in a backward or forward direction, it is prevented from being risen from the floor and can be stably moved in the back and forth direction.

Next, a dive-down state of a seat according to an embodiment of the present invention will be explained.

Figure 7:
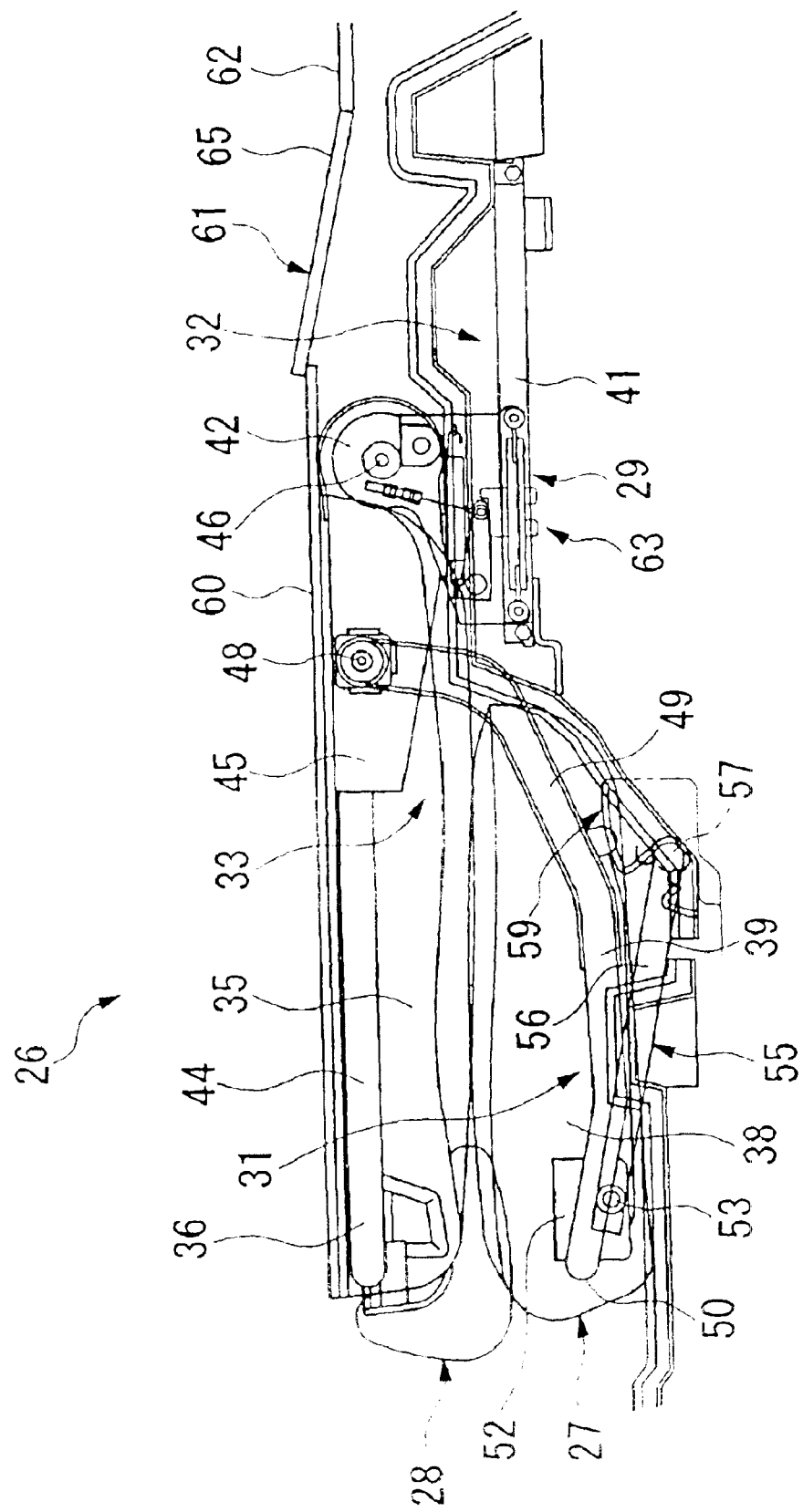
FIG. 7 is a diagram showing a side view of the second center seat in a dive-down state, which is used in the seat arrangement structure for a vehicle according to an embodiment of the present invention.

When the lock of the slide members 42 by the lock mechanism is released at the front end position of the slidable range shown in FIG. 6, the seat back 28 rotates around the rotary shaft portion 46 in a forward direction by an energizing force of a spring which is not shown in the figure. Then, the supporting shaft 48 of the seat back 28 which has been located above the rotary shaft portion 46 moves in a front and downward direction. As a result, as shown in FIG. 7, the rear portion of the seat cushion frame 39, which is connected to the supporting shaft 48, moves in a front and downward direction, and the front portion of the seat cushion frame 39 also moves in a front and downward direction when the link arm 55 which is rotatably connected to the rotary shaft 53 is brought forward by rotating around the connection part 57 supported by the supporting member 59. Accordingly, the seat cushion frame 39 as a whole moves in a front and downward direction so that the seat cushion main body 38 is also moved in a front and downward direction to be located above the low-level floor 31. At that time, the seat back 28 lies on the seat cushion 27 so that the back surface 60 thereof is substantially horizontally placed. Accordingly, the contact plate 61 which contacts the back surface 60 of the center seat 26 is also substantially horizontally placed.

Figure 8:
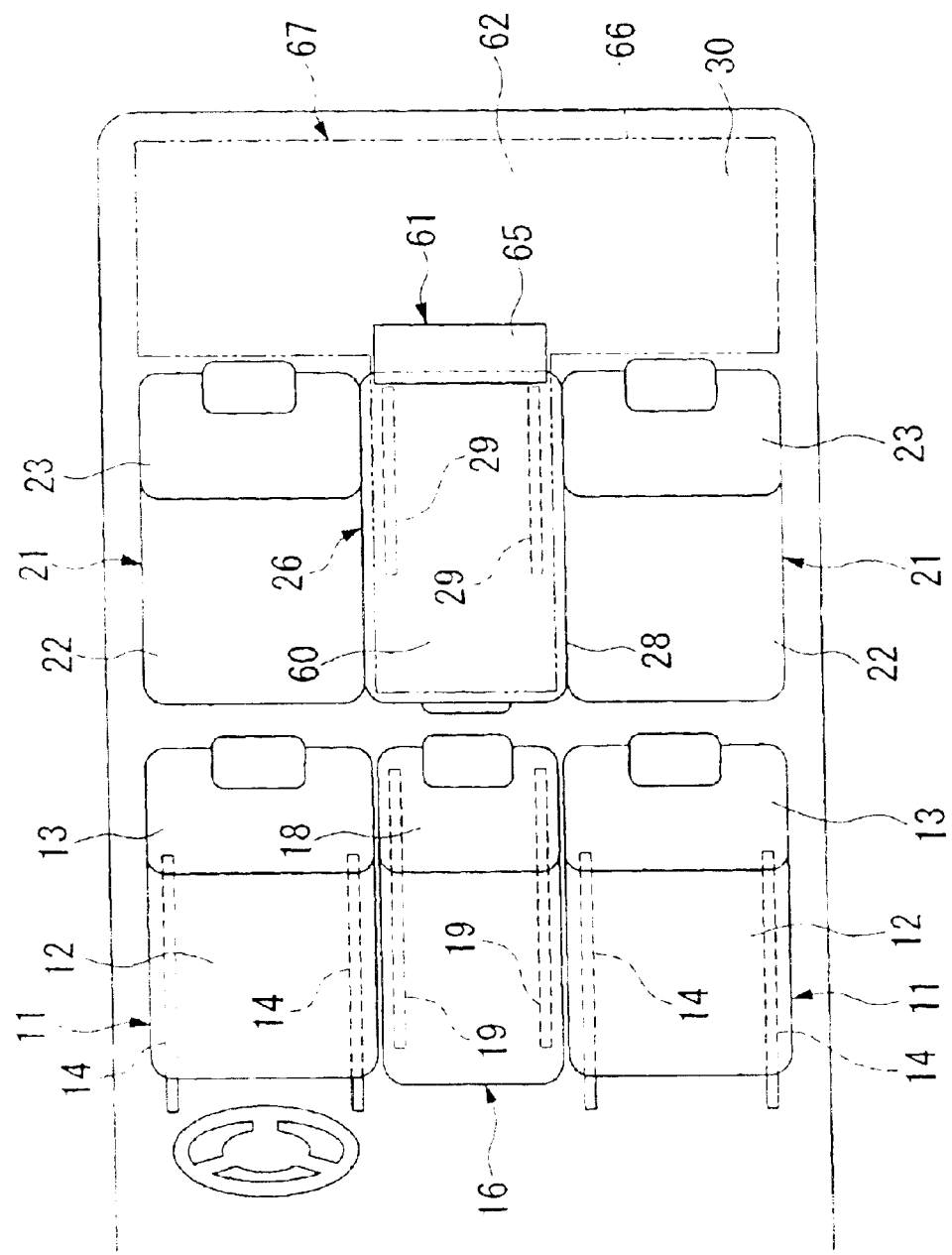
FIG. 8 is a diagram showing a plan view of the seat arrangement structure for a vehicle with the second center seat in a dive-down state according to an embodiment of the present invention.

In the above-mentioned state of the second center seat 26 in which the seat back 28 is brought forward and placed above the low-level floor 31, since the contact plate 61 is aligned substantially horizontally with respect to the back surface 60 of the seat back 28 of the center seat 26, the trunk room floor 62 is aligned substantially horizontally with respect to the upper surface 65 of the contact plate 61 and the back surface 60 of the seat back 28 so as to form, as shown in FIG. 8, a substantially flat floor 66 of a T-shape extending from the seat back 28 of the second center seat 26 to the trunk room floor 62. As a result, a T-shaped space 67 is formed on the T-shape floor 65, which extends to the roof of the vehicle (not shown in the figure).

Figure 10:
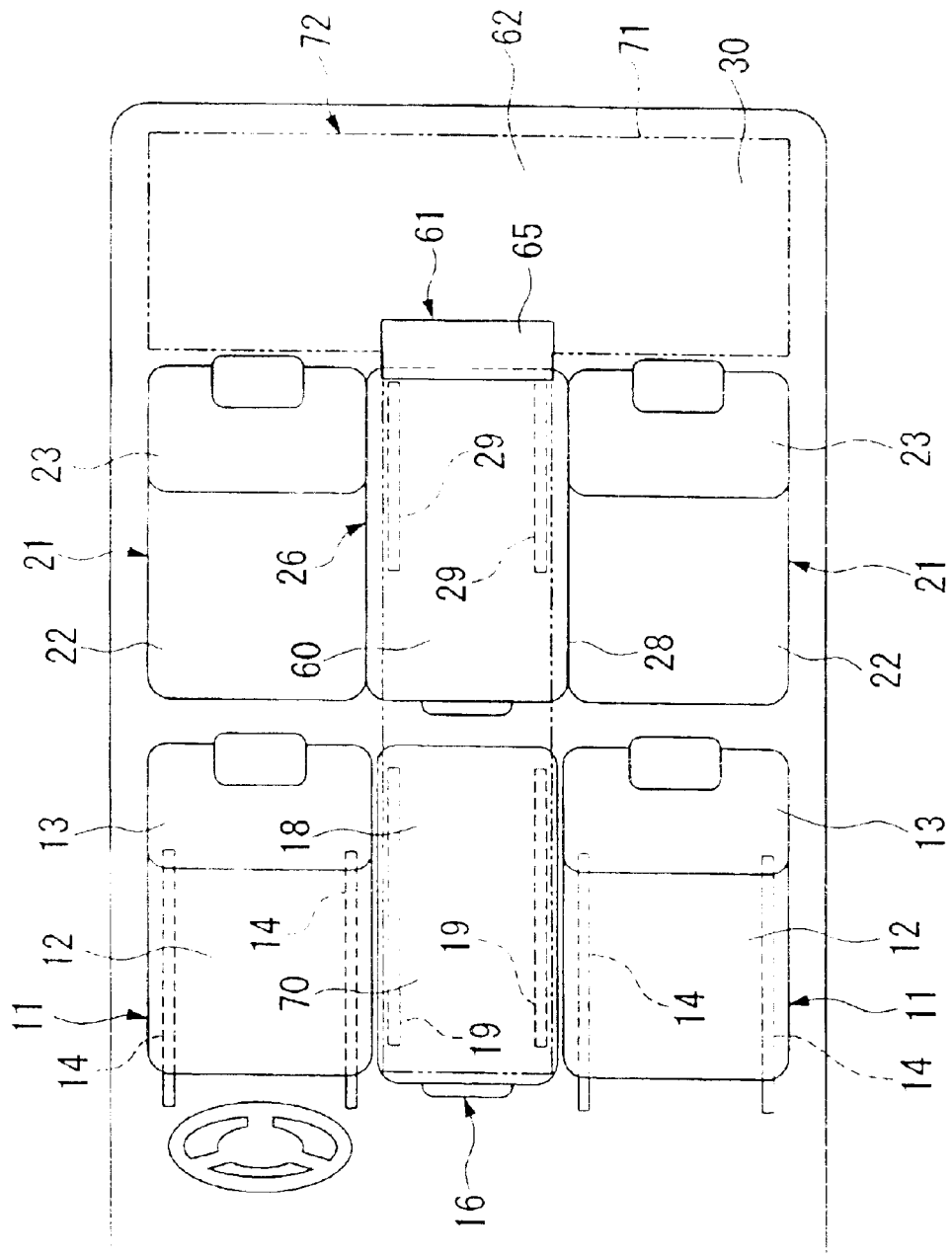
FIG. 10 is a diagram showing a plan view of the seat arrangement structure for a vehicle with the second center seat in a dive-down state and the first center seat in a forward brought-down state according to an embodiment of the present invention.

When the seat back 18 of the first center seat 16 in at the first row is brought forward until it is placed on the seat cushion 17, the back surface 70 of the seat back 18 of the first center seat 16 at the first row located on the floor 69 which is lower than the adjacent lower-floor 31, forms a substantially flat surface together with the back surface 60 of the seat back 28 of the second center seat 26. Accordingly, as shown in FIG. 10, a floor 71 of a T-shape in which the above-mentioned T-shaped floor 66 is extended in a front direction to the seat back 18 of the first center seat 16 may be formed. As a result, a space 72 of T-shape in which the above-mentioned T-shaped space 67 is extended in the front direction, can be formed on the T-shaped floor 71 to the roof of the vehicle (not shown in the figure).

Also, in a seating state of the seat back 28 of the second center seat 26, it is possible to separate the link arm 55 from the supporting member 59 and rotate the seat cushion 27 around the supporting shaft 48 so as to stand together with the seat back 28. At that time, the link arm 55 hangs from the seat cushion 27 downwardly due to the weight thereof, although this is not shown in the figures.

Moreover, although not shown in the figures, since the position for attaching a seat belt may become independent of the slide position if an inner anchor is attached to the slide member 42 guided by the slide rail 41, excellent fit of the seat belt can always be obtained even when slide members 42 are moved.

According to the embodiment of the present invention explained above, since the pair of the first side seats 11 at the first row are designed to be slidable in the back and forth direction, it is possible to adjust the position thereof in accordance with the build of the driver. Accordingly, it becomes possible for a driver to comfortably drive the vehicle.

Also, in the seats of the first row, since the first center seat 16 is made slidable only in a backward direction from a position where the front end portion thereof is aligned with the front end portion of the pair of first side seats 11, and the pair of first side seats 11 are made slidable only in a front direction from a position where the front end portion thereof is aligned with the front end portion of the first center seat 16, if three passengers are sitting in the seats of the first row and they are unaware that a V-shaped layout can be formed, a V-shaped seat layout of the seats is surely formed by sliding the first side seat 11 or the first center seat 16 when a passenger feels cramped. In the seats in the second row also, since the second center seat 26 is made slidable only in a backward direction from a position where the front end portion thereof is aligned with the front end portion of the pair of second side seats 21, and the pair of second side seats 21 are made slidable only in a front direction from a position where the front end portion thereof is aligned with the front end portion of the second center seat 26, if three passengers are sitting on the seats of the second row and they are unaware that a V-shaped layout can be formed, a V-shaped seat layout of the seats is surely formed by sliding the second side seat 21 or the second center seat 26 when he feels constrained. That is, according to the present invention, a V-shaped layout of the seats can be surely formed by sliding a seat. Accordingly, even for a small car, a comfortable seat arrangement structure for six passengers can be realized by preventing contact among the passengers.

Moreover, since it is possible to align the front end of the first center seat 16 and the front end of each of the pair of first side seats 11 in the first row, and the front end of the second center seat 26 and the front end of each of the pair of second side seats 21 in the second row, a straight line layout in which the position of the first center seat 16 is not shifted from the position of each of the first side seats 11, and the position of the second center seat 26 is not shifted from the position of each of the second side seats 21 can be formed. Accordingly, if this layout is formed, a passenger can comfortably relax by lying on the first center seat 16 and the pair of first side seats 11, or on the second center seat 26 and the pair of second side seats 21.

Furthermore, since the width of the first center seat 16 is made narrower than the width of each of the pair of first side seats 11, and the width of the second center seat 26 is made narrower than the width of each of the pair of second side seats 21, the width of each of the first side seats 11 and that of each of the second side seats 21, which are more frequently used than the center seats 16 or 26, can be retained. Accordingly, it is not necessary to sacrifice a comfortable seating feeling obtained when a small number of passengers ride in a car, which occurs more frequently.

In addition, since the substantially flat T-shaped floor 66 which extends from the seat back 28 of the second center seat 26 to the trunk room floor 62 is formed and the space 67 of T-shape which extends to the roof of the vehicle is formed on the T-shaped floor 66 by moving the second center seat 26, which has been located above the high-level floor 32, so as to be located above the low-level floor 31 in a front brought-down state of the seat back 28, an object which is long can be suitable accommodated in the vehicle. Accordingly, the convenience of the vehicle is improved.

Also, since the T-shaped floor 71 which extends in a forward direction to the seat back 18 is formed by bringing down the seat back 18 of the first center seat 16 in a forward direction, and the T-shaped space 72 which extends to the roof of the vehicle is formed on the T-shaped floor 71, an object which is long can be suitably accommodated in the vehicle. Accordingly, the convenience of the vehicle is improved.

Having thus described exemplary embodiments of the invention, it will be apparent that various alterations, modifications, and improvements will readily occur to those skilled in the art. Such alterations, modifications, and improvements, though not expressly described above, are nonetheless intended and implied to be within the spirit and scope of the invention. Accordingly, the foregoing discussion is intended to be illustrative only; the invention is limited and defined only by the following claims and equivalents thereto.

What is claimed is:

1. A seat arrangement structure for a vehicle, comprising:
    a pair of first side seats disposed at right and left sides of the vehicle;
    a first center seat disposed between the pair of first side seats, the first center seat and the pair of first side seats being disposed in a first row viewed from a front of the vehicle;
    a pair of second side seats disposed at right and left sides of the vehicle; and
    a second center seat disposed between the pair of second side seats; the second center seat and the pair of second side seats being disposed in a second row viewed from the front of the vehicle; wherein
    the first center seat is made slidable, in a back and forth direction, only within a range rearward of a position where a front end portion of the first center seat is aligned with a front end portion of each of the pair of first side seats;
    each of the pair of first side seats is made slidable, in a back and forth direction, only within a range forward of a position where the front end portion of the pair of first side seats is aligned with the front end portion of the first center seat; and
    a width of the first center seat is made narrower than a width of each of the pair of first side seats.

2. A seat arrangement structure for a vehicle as set forth in claim 1, wherein
    the second center seat is made slidable, in a back and forth direction, only within a range rearward of a position where a front end portion of the second center seat is aligned with a front end portion of each of the pair of second side seats;
    a position of each of the pair of second side seats is fixed; and
    a width of the second center seat is made narrower than a width of each of the pair of second side seats.

3. A seat arrangement structure for a vehicle as set forth in claim 1, further comprising:
    a trunk room which is disposed directly behind the pair of second side seats and the second center seat, wherein
    the second center seat, with its seat back being brought forward, is moved down to be placed on a low-level floor so that a substantially flat floor of a T-shape including the seat back of the second center seat and a floor of the trunk room, and a T-shaped space on the substantially flat floor of a T-shape, are formed.

4. A seat arrangement structure for a vehicle as set forth in claim 3, wherein
    an area of the substantially flat floor of a T-shape, and an area of the T-shaped space, are increased by bringing down a seat back of the first center seat in a forward direction.

* * * * *